United States Patent
Iguchi et al.

(10) Patent No.: US 11,665,405 B2
(45) Date of Patent: *May 30, 2023

(54) TRANSMISSION METHOD, RECEPTION METHOD, TRANSMISSION APPARATUS, AND RECEPTION APPARATUS

(71) Applicant: Panasonic Intellectual Property Corporation of America, Torrance, CA (US)

(72) Inventors: Noritaka Iguchi, Osaka (JP); Tadamasa Toma, Osaka (JP); Hisaya Katou, Kanagawa (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/588,936

(22) Filed: Jan. 31, 2022

(65) Prior Publication Data

US 2022/0150599 A1 May 12, 2022

Related U.S. Application Data

(63) Continuation of application No. 16/892,774, filed on Jun. 4, 2020, now Pat. No. 11,272,258, which is a
(Continued)

(30) Foreign Application Priority Data

Sep. 9, 2014 (JP) .............................. JP2014-183694

(51) Int. Cl.
*H04N 7/20* (2006.01)
*H04N 21/643* (2011.01)
(Continued)

(52) U.S. Cl.
CPC ... *H04N 21/64322* (2013.01); *H04L 61/5007* (2022.05); *H04L 69/04* (2013.01);
(Continued)

(58) Field of Classification Search
CPC .......... H04N 21/64322; H04N 21/242; H04N 21/4302; H04N 21/6125; H04N 21/6143;
(Continued)

(56) References Cited

U.S. PATENT DOCUMENTS 9,992,549 B2    6/2018  Iguchi
2004/0019681 A1 1/2004  Nakamura
(Continued)

FOREIGN PATENT DOCUMENTS

JP    2011-103556    5/2011
JP    2011-103568    5/2011

OTHER PUBLICATIONS

International Search Report of PCT application No. PCT/JP2014/004863 dated Dec. 22, 2014.
(Continued)

*Primary Examiner* — Mulugeta Mengesha
(74) *Attorney, Agent, or Firm* — Wenderoth, Lind & Ponack, L.L.P.

(57) ABSTRACT

A transmission method includes: generating one or more transfer frames that each store one or more streams used for content transfer; and transmitting the one or more generated frames through broadcast, each of the one or more streams storing one or more second transfer units, each of the one or more second transfer units storing one or more first transfer units, and each of the one or more first transfer units storing one or more Internet Protocol (IP) packets. In at least one stream among the one or more streams, each of the first
(Continued)

transfer units positioned at a head contains reference clock information indicating time used for reproduction of the content.

4 Claims, 19 Drawing Sheets

Related U.S. Application Data continuation of application No. 16/394,781, filed on Apr. 25, 2019, now Pat. No. 10,715,876, which is a continuation of application No. 15/956,301, filed on Apr. 18, 2018, now Pat. No. 10,321,200, which is a continuation of application No. 15/075,229, filed on Mar. 21, 2016, now Pat. No. 9,992,549, which is a continuation of application No. PCT/JP2014/004863, filed on Sep. 24, 2014.

(60) Provisional application No. 61/884,335, filed on Sep. 30, 2013.

(51) Int. Cl.
| | |
|---|---|
| *H04L 69/04* | (2022.01) |
| *H04L 69/22* | (2022.01) |
| *H04L 69/28* | (2022.01) |
| *H04N 21/242* | (2011.01) |
| *H04N 21/43* | (2011.01) |
| *H04N 21/61* | (2011.01) |
| *H04N 21/845* | (2011.01) |
| *H04N 21/8547* | (2011.01) |
| *H04L 61/5007* | (2022.01) |
| *H04L 69/32* | (2022.01) |
| *H04J 3/06* | (2006.01) |

(52) U.S. Cl.
CPC ............ *H04L 69/22* (2013.01); *H04L 69/28* (2013.01); *H04L 69/32* (2013.01); *H04N 21/242* (2013.01); *H04N 21/4302* (2013.01); *H04N 21/6125* (2013.01); *H04N 21/6143* (2013.01); *H04N 21/6175* (2013.01); *H04N 21/6193* (2013.01); *H04N 21/845* (2013.01); *H04N 21/8547* (2013.01); *H04J 3/0667* (2013.01)

(58) Field of Classification Search
CPC .......... H04N 21/6175; H04N 21/6193; H04N 21/845; H04N 21/8547; H04L 29/10; H04L 69/04; H04L 69/22; H04L 69/28; H04L 61/2007
See application file for complete search history.

(56) References Cited

U.S. PATENT DOCUMENTS

| | | | | |
|---|---|---|---|---|
| 2011/0255558 A1* | 10/2011 | Hwang | ................... | H04L 65/70 |
| | | | | 370/474 |
| 2013/0097470 A1* | 4/2013 | Hwang | ................. | H03M 13/35 |
| | | | | 714/E11.032 |
| 2016/0192028 A1* | 6/2016 | Iguchi | .............. | H04N 21/23605 |
| | | | | 725/67 |

OTHER PUBLICATIONS

"Information technology—High efficiency coding and media delivery in heterogeneous environments—Part 1: MPEG media transport(MMT)", ISO/IEC FDIS 23008-1, 2013
Extended European Search Report dated Sep. 9, 2016 in related European Application No. 14847603.9.
Office Action dated Sep. 27, 2017 in corresponding Chinese Application No. 201480045742.4 (with English translation of Search Report).

* cited by examiner

DATA TYPE: IPv4 PACKET/IPv6 PACKET/COMPRESSED IP PACKET/
NULL PACKET/TRANSFER CONTROL SIGNAL (AMT AND NIT)

| DATA TYPE | DATA LENGTH 16 BITS | DATA |
|---|---|---|

FIG. 9

DATA TYPE = LONG-FORMAT NTP, DATA LENGTH = 64 BITS

| DATA TYPE | DATA LENGTH | REFERENCE CLOCK INFORMATION |
|---|---|---|

FIG. 11

DATA TYPE = IP PACKET WITH REFERENCE CLOCK

| DATA TYPE | DATA LENGTH | REFERENCE CLOCK INFORMATION | IP PACKET |
|---|---|---|---|

FIG. 12

DATA TYPE = IP PACKET

| REFERENCE CLOCK INFORMATION | DATA TYPE | DATA LENGTH | IP PACKET |
|---|---|---|---|

FIG. 16

| CHANGE INSTRUCTION 8 | TRANSFER MODE/ SLOT INFORMATION 192 | STREAM CLASSIFICATION/ RELATIVE STREAM INFORMATION 128 | PACKET FORM/ RELATIVE STREAM INFORMATION 896 | POINTER/ SLOT INFORMATION 3840 | RELATIVE STREAM SLOT INFORMATION 480 | RELATIVE STREAM/ TRANSFER STREAM ID CORRESPONDENCE TABLE INFORMATION 256 | TRANSMISSION-RECEPTION CONTROL INFORMATION 8 | EXTENSION INFORMATION 3614 |

FIG. 17

| STREAM CLASSIFICATION OF RELATIVE STREAM 0 8 | STREAM CLASSIFICATION OF RELATIVE STREAM 1 8 | STREAM CLASSIFICATION OF RELATIVE STREAM 2 8 | STREAM CLASSIFICATION OF RELATIVE STREAM 3 8 | ... | STREAM CLASSIFICATION OF RELATIVE STREAM 12 8 | STREAM CLASSIFICATION OF RELATIVE STREAM 13 8 | STREAM CLASSIFICATION OF RELATIVE STREAM 14 8 | STREAM CLASSIFICATION OF RELATIVE STREAM 15 8 |

TRANSMISSION METHOD, RECEPTION METHOD, TRANSMISSION APPARATUS, AND RECEPTION APPARATUS

BACKGROUND

1. Technical Field

The present disclosure relates to a transmission method and the like for transferring content by using IP (Internet Protocol) packets through broadcast.

2. Description of the Related Art

An MMT scheme (refer to NPTL 1) is a multiplexing scheme for multiplexing and packetizing content such as video and audio and for transmitting the content through one or more transfer channels such as broadcast and broadband. When the MMT scheme is applied to broadcasting systems, reference clock information of a transmission apparatus is transmitted to a reception apparatus, and the reception apparatus generates a system clock in the reception apparatus based on the reference clock information.

CITATION LIST

Non-Patent Literature

NPTL 1: Information technology-High efficiency coding and media delivery in heterogeneous environments-Part1: MPEG media transport (MMT), ISO/IEC FDIS 23008-1

SUMMARY

In one general aspect, the techniques disclosed here feature a transmission method including: generating one or more transfer frames that each store one or more streams used for content transfer; and transmitting the one or more generated frames through broadcast, each of the one or more streams storing one or more second transfer units, each of the one or more second transfer units storing one or more first transfer units, each of the one or more first transfer units storing one or more Internet Protocol (IP) packets. In at least one stream among the one or more streams, each of the first transfer units positioned at a head contains reference clock information indicating time used for reproduction of the content.

The transmission method and the like according to one aspect of the present disclosure may reduce processes for acquiring the reference clock information by a reception apparatus.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

It should be noted that general or specific embodiments may be implemented as a system, a method, an integrated circuit, a computer program, a storage medium, or any selective combination thereof.

BRIEF DESCRIPTION OF THE DRAWINGS

FIG. 9 is a diagram illustrating an example in which a long-format NTP is stored in the TLV packet;

FIG. 11 is a diagram illustrating structure in which the reference clock information is appended immediately before an IP packet header;

FIG. 12 is a diagram illustrating structure in which the reference clock information is appended immediately before the TLV packet;

FIG. 16 is a diagram illustrating structure of TMCC control information under a transfer scheme of an advanced broadband satellite digital broadcast;

FIG. 17 is a diagram illustrating stream classification/relative stream information of the TMCC control information;

Figures 1, 2:
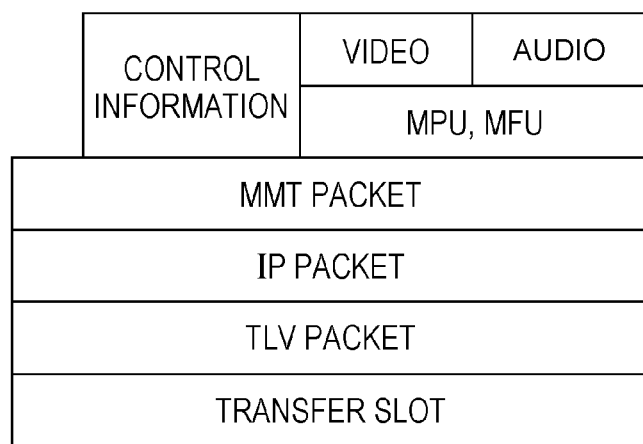
FIG. 1 is a diagram illustrating a protocol stack for performing transfer using an MMT scheme and an advanced BS transfer scheme.
FIG. 2 is a diagram illustrating data structure of a TLV packet.

DETAILED DESCRIPTION (Underlying Knowledge Forming Basis of the Present Disclosure)

The present disclosure relates to a method and apparatus in which a reception apparatus receives reference clock information transmitted from a transmission apparatus and generates (reproduces) a reference clock in a hybrid delivery system using an MMT (MPEG Media Transport) scheme which is under standardization by MPEG (Moving Picture Expert Group).

The MMT scheme is a multiplexing scheme for multiplexing and packetizing video and audio to transmit the video and audio via one or more transfer channels, such as broadcast and broadbands.

When the MMT scheme is applied to a broadcasting system, the reference clock of the transmission apparatus is synchronized with an NTP (Network Time Protocol) prescribed by IETF RFC 5905, and based on the reference clock, a time stamp such as PTS (Presentation Time Stamp) and DTS (Decode Time Stamp) is added to a medium. Furthermore, the transmission apparatus transmits the reference clock information to the reception apparatus, and the reception apparatus generates the reference clock (hereinafter referred to as a system clock) in the reception apparatus based on the reference clock information.

In the broadcasting system, a 64-bit long-format NTP capable of indicating absolute time is preferably used as the reference clock information. However, although the conventional MMT scheme prescribes storing a 32-bit short-format NTP in an MMT packet header and transferring the 32-bit short-format NTP, the conventional MMT scheme does not prescribe transferring the long-format NTP, and it is difficult for a receiver apparatus to acquire high-precision reference clock information.

In contrast, control information, such as a message, a table, and a descriptor, is defined using the long-format NTP. It is possible to append the MMT packet header to the control information for transfer. An MMT packet, which is the control information to which the MMT packet header is appended, is stored in an IP packet, and is transferred through a broadcast transfer channel or a broadband transfer channel.

When the MMT packet is transferred using an advanced BS transfer scheme prescribed by the ARIB standard (transfer scheme of an advanced broadband satellite digital broadcast), after encapsulation of the MMT packet into the IP packet and encapsulation of the IP packet into a TLV (Type Length Value) packet, the MMT packet is stored in a transfer slot prescribed by the advanced BS transfer scheme.

However, when the transmission apparatus stores the reference clock information in an MMT packet layer, in order to obtain the reference clock information, the reception apparatus extracts the TLV packet from the transfer slot, extracts the IP packet from the TLV packet, extracts the MMT packet from the IP packet, and further extracts the reference clock information from the header or a payload of the MMT packet. Therefore, the reception apparatus involves many processes for acquiring the reference clock information, and needs longer time until the acquisition.

Also, processes in layers equal to or higher than an IP layer are software processes. Accordingly, when the reference clock information is stored in the MMT packet, the reference clock information is extracted and reproduced by a software program. Therefore, the reference clock information to be acquired may contain jitter, by throughput of a CPU, interruption from and priority of other software programs, and the like.

Therefore, a transmission method according to one aspect of the present disclosure includes: generating one or more transfer frames that each store one or more streams used for content transfer; and transmitting the one or more generated frames through broadcast, each of the one or more streams storing one or more second transfer units, each of the one or more second transfer units storing one or more first transfer units, each of the one or more first transfer units storing one or more Internet Protocol (IP) packets. In at least one stream among the one or more streams, each of the first transfer units positioned at a head contains reference clock information indicating time used for reproduction of the content.

Thus, by containing the reference clock information in the TLV packet positioned at a head within a head slot in one or more streams contained in the transfer slot, the reception apparatus may specify a position of the reference clock information of the at least one stream in advance. Therefore, the reception apparatus may reduce (simplify) processes for acquiring the reference clock information of the one or more streams. Here, an example of the first transfer unit is a TLV packet. An example of the second transfer unit is a slot, and an example of the transfer frame is a transfer slot.

In addition, by containing the reference clock information in the TLV packet positioned at a head within the slot positioned at a head in each of the streams contained in the transfer slot, the reception apparatus may specify the position of the reference clock information on each of the plurality of streams in advance. Therefore, the reception apparatus may reduce (simplify) the processes for acquiring the reference clock information on each of the plurality of streams.

In addition, each of the first transfer units may be a variable-length transfer unit, and each of the second transfer units may be a fixed-length transfer unit.

In addition, each of the first transfer units positioned at a head may include an IP packet that does not undergo header compression processing.

Thus, by the transmission apparatus prescribing presence of header compression of the IP packets, the reception apparatus may specify the position of the reference clock information in more detail. Therefore, the reception apparatus may simplify the process for acquiring the reference clock information.

In addition, each of the first transfer units may be a Type Length Value (TLV) packet, each of the second transfer units may be a slot under the transfer scheme of the advanced broadband satellite digital broadcast, and the frame may be a transfer slot under the transfer scheme of the advanced broadband satellite digital broadcast.

In addition, the reference clock information may be a Network Time Protocol (NTP).

In addition, the one or more frames may be transmitted in a predetermined transmission cycle.

A reception method according to one aspect of the present disclosure includes: receiving one or more frames through broadcast; extracting reference clock information from at least one frame among the one or more received frames; and generating a clock used for reproduction of content by using the extracted reference clock information, each of the one or more frames containing one or more second transfer units, each of the one or more second transfer units containing one or more first transfer units, and each of the one or more first transfer units containing one or more Internet Protocol (IP) packets.

A transmission apparatus according to one aspect of the present disclosure includes: generation circuitry which, in operation, generates one or more frames used for content transfer; and transmission circuitry which, in operation, transmits the one or more generated frames through broadcast, each of the one or more streams storing one or more second transfer units, each of the one or more second transfer units storing one or more first transfer units, and each of the one or more first transfer units storing one or more Internet Protocol (IP) packets. In at least one stream among the one or more streams, each of the first transfer units positioned at a head contains reference clock information indicating time used for reproduction of the content.

A reception apparatus according to one aspect of the present disclosure includes: reception circuitry which, in operation, receives one or more frames; extraction circuitry which, in operation, extracts reference clock information from at least one frame among the one or more received frames; and a generator that generates a clock used for reproduction of the content by using the extracted reference clock information, each of the one or more frames containing one or more second transfer units, each of the one or more second transfer units containing one or more first transfer units, and each of the one or more first transfer units containing one or more Internet Protocol (IP) packets.

Note that these general or specific aspects may be implemented using a system, an apparatus, a method, an integrated circuit, a computer program, or a computer-readable recording medium such as a CD-ROM. Also, these general or specific aspects may be implemented using an arbitrary combination of a system, an apparatus, a method, an integrated circuit, a computer program, and a recording medium.

First Exemplary Embodiment

[Basic Configuration of an MMT Scheme]

First, a basic configuration of an MMT scheme will be described. FIG. 1 illustrates a protocol stack diagram for performing transfer using the MMT scheme and an advanced BS transfer scheme.

Under the MMT scheme, information such as video and audio is stored in a plurality of MPUs (Media Presentation Units) and a plurality of MFUs (Media Fragment Units), and an MMT packet header is added for MMT-packetization.

Meanwhile, under the MMT scheme, the MMT packet header is also added to control information such as an MMT message for MMT-packetization. The MMT packet header is provided with a field that stores a 32-bit short-format NTP, and this field may be used for QoS control of communication networks, etc.

MMT-packetized data is encapsulated into an IP packet having a UDP header or IP header. At this time, in the IP header or UDP header, when a set of packets with an identical source IP address, destination IP address, source port number, destination port number, and protocol classification is an IP data flow, headers of a plurality of IP packets contained in one IP data flow are redundant. Therefore, header compression of some IP packets is performed in one IP data flow.

Next, a TLV packet will be described in detail. FIG. 2 is a diagram illustrating data structure of the TLV packet.

As illustrated in FIG. 2, an IPv4 packet, IPv6 packet, compressed IP packet, NULL packet, and transfer control signal are stored in the TLV packet. These pieces of information are identified using an 8-bit data type. Examples of the transfer control signal include an AMT (Address Map Table) and NIT (Network Information Table). Also, the TLV packet indicates a data length (byte unit) using a 16-bit field, and a value of data is stored thereafter. Since there is 1-byte header information before the data type (not illustrated in FIG. 2), the TLV packet has a header area of 4 bytes in total.

The TLV packet is mapped to a transfer slot under the advanced BS transfer scheme. Pointer/slot information that indicates a head position of a first packet and a tail position of a last packet which are contained in every slot are stored in TMCC (Transmission and Multiplexing Configuration Control) control information.

Figure 3:
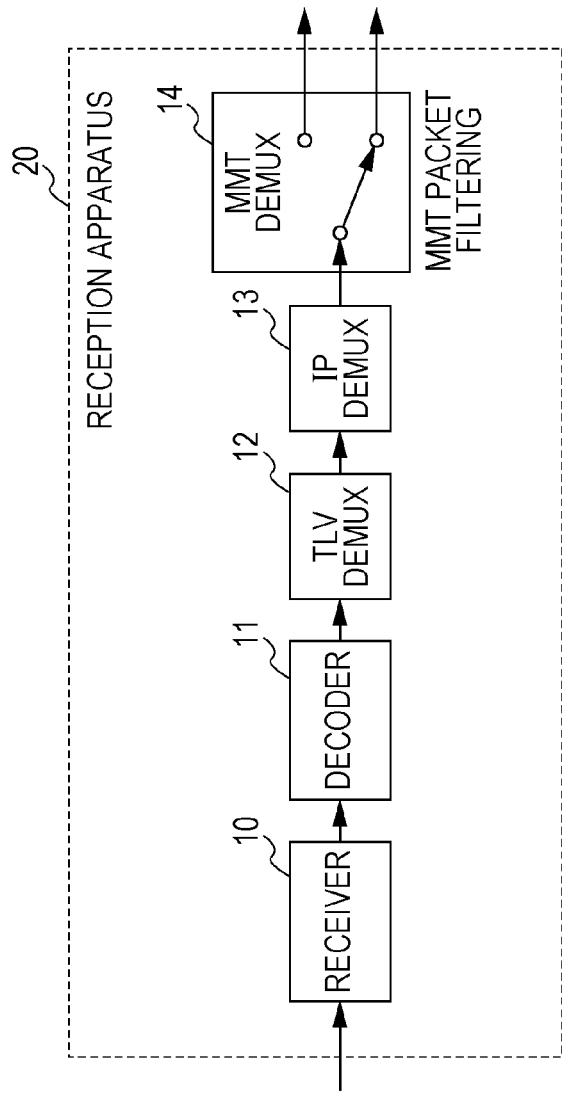
FIG. 3 is a block diagram illustrating a basic configuration of a reception apparatus.

Next, a configuration of a reception apparatus that receives the MMT packet transferred by using the advanced BS transfer scheme will be described. FIG. 3 is a block diagram illustrating the basic configuration of the reception apparatus. Note that the configuration of the reception apparatus of FIG. 3 is simplified. More specific configuration will be individually described later according to a manner in which reference clock information is stored.

Reception apparatus 20 includes receiver 10, decoder 11, TLV demultiplexer (DEMUX) 12, IP demultiplexer (DEMUX) 13, and MMT demultiplexer (DEMUX) 14.

Receiver 10 receives transfer channel coded data.

Decoder 11 decodes the transfer channel coded data received by receiver 10, applies error correction and the like, and extracts a TMCC control signal and TLV data. The TLV data extracted by decoder 11 undergoes DEMUX processing by TLV demultiplexer 12.

The DEMUX process performed by TLV demultiplexer 12 differs according to the data type. For example, when the data type is a compressed IP packet, TLV demultiplexer 12 performs processes such as decompressing the compressed header and passing the header to an IP layer.

IP demultiplexer 13 performs processes such as header analysis of the IP packet or UDP packet, and extracts the MMT packet from each IP data flow.

MMT demultiplexer 14 performs a filtering process (MMT packet filtering) based on a packet ID stored in the MMT packet header.

[Method for Storing the Reference Clock Information in the MMT Packet]

Under the MMT scheme described with reference to FIG. 1 to FIG. 3 described above, although the 32-bit short-format NTP may be stored in the MMT packet header and transferred, there exists no method for transferring a long-format NTP.

Hereinafter, a method for storing the reference clock information in the MMT packet will be described. First, the method for storing the reference clock information within the MMT packet will be described.

When control information that defines a descriptor, a table, or a message for storing the reference clock information is stored in the MMT packet, the descriptor indicating the reference clock information and an identifier indicating the table or message are indicated within the control information. Then, the control information is stored in the MMT packet by the transmission apparatus.

This allows reception apparatus 20 to identify the reference clock information based on the identifier. Note that the reference clock information may be stored in the MMT packet by using existing descriptors (for example, CRI_descriptor( ), etc.).

Next, a method for storing the reference clock information in the MMT packet header will be described.

For example, there is a method for storing the reference clock information by using a header_extension field (hereinafter referred to as an extension field). The extension field becomes effective when an extension_flag of the MMT packet header is set to "1".

The reference clock information is stored in the extension field through storage, in the extension field, of an extension field type indicating data classification of data to be stored in the extension field, and through storage of information indicating the reference clock information (for example, a 64-bit long-format NTP) in the extension field type.

When the header_extension_flag of the MMT packet header is '1', reception apparatus 20 references the extension field of the MMT packet. When the extension field type indicates the reference clock information, reception apparatus 20 extracts the reference clock information and reproduces a clock.

Note that the reference clock information may be stored in an existing header field. In addition, when there is an unused field or when there is a field unnecessary for broadcast, the reference clock information may be stored in these fields.

In addition, the reference clock information may be stored by using the existing field and the extension field together. For example, the existing 32-bit short-format NTP field and the extension field may be used together.

In the reference clock information, in order to maintain compatibility with the existing field, of the 64-bit long-format NTP, only a 32-bit section corresponding to a short-format format may be stored in the existing field, and remaining 32 bits may be stored in the extension field.

Here, the reference clock information is, for example, time when a head bit of the MMT packet in which the reference clock information is stored passes a predetermined position (for example, when the head bit is output from a specific component of a transmission apparatus). However, the reference clock information may be time when a bit of another position passes the predetermined position.

When the reference clock information is stored in the MMT packet as the control information, the MMT packet containing the control information is transmitted at predetermined transmission intervals.

When the reference clock information is stored in the extension field of the MMT packet, the reference clock information is stored in the predetermined extension field of the MMT packet header. Specifically, for example, at least one or more pieces of the reference clock information are stored in the header extension field of the MMT packet at intervals of 100 ms.

Note that, when the reference clock information is stored in the MMT packet, the packet ID of the MMT packet that stores the reference clock information is stored in program information. Reception apparatus 20 analyzes the program information and acquires the MMT packet in which the reference clock information is stored. At this time, the packet ID of the MMT packet in which the reference clock information is stored may be prescribed in advance as a fixed value. This allows reception apparatus 20 to acquire the reference clock information without analyzing the program information.

[Operation Flow when the Reference Clock Information is Stored in the MMT Packet]

Next, an operation flow when the reference clock information is stored in the MMT packet (acquisition flow of the reference clock information) will be described.

Figure 4:
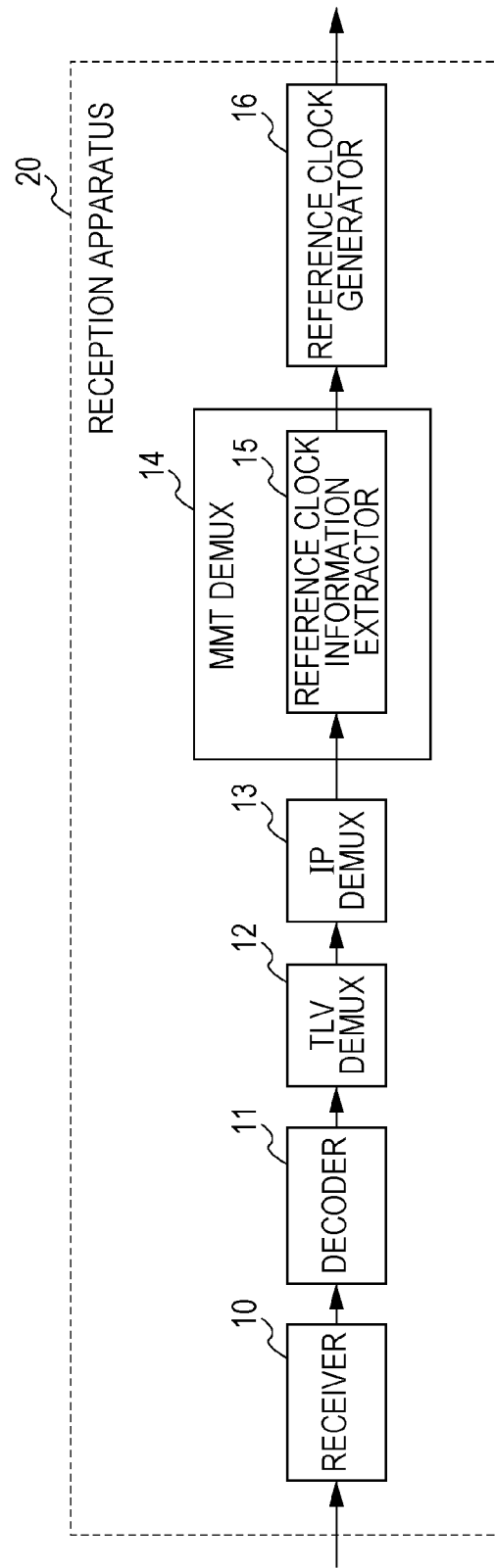
FIG. 4 is a block diagram illustrating a functional configuration of the reception apparatus when reference clock information is stored in an extension field of an MMT packet header.
Figure 5:
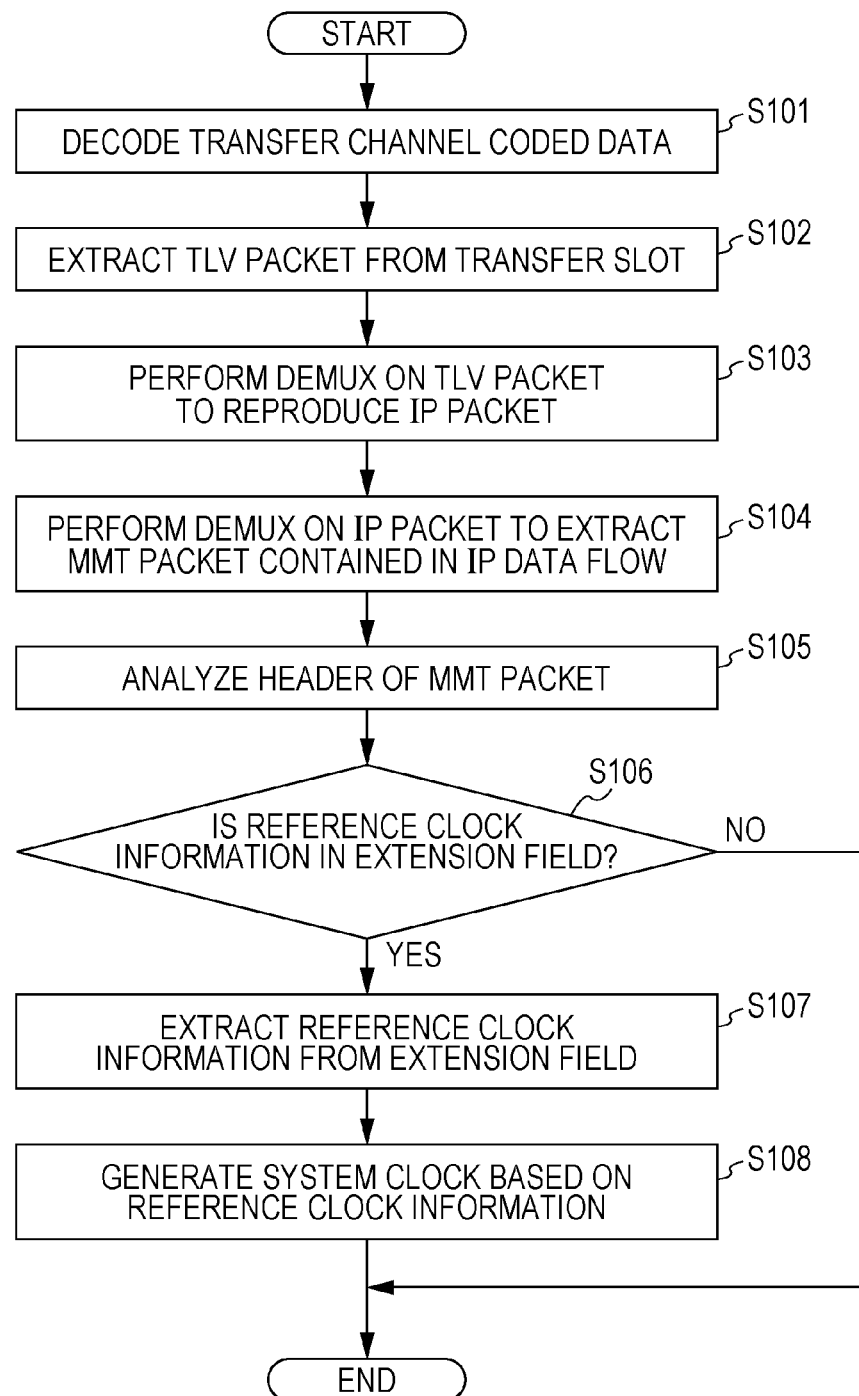
FIG. 5 is a diagram illustrating an acquisition flow of the reference clock information performed by the reception apparatus when the reference clock information is stored in the extension field of the MMT packet header.

First, the following describes the acquisition flow of the reference clock information performed by reception apparatus 20 when the reference clock information is stored in the extension field of the MMT packet header. FIG. 4 is a block diagram illustrating a functional configuration of reception apparatus 20 when the reference clock information is stored in the extension field of the MMT packet header. FIG. 5 is a diagram illustrating the acquisition flow of the reference clock information performed by reception apparatus 20 when the reference clock information is stored in the extension field of the MMT packet header.

In FIG. 4, when the reference clock information is stored in the extension field of the MMT packet header, MMT demultiplexer 14 includes reference clock information extractor 15 (an example of an extractor), and reference clock generator 16 (an example of a generator) is provided downstream of MMT demultiplexer 14.

In the flow of FIG. 5, decoder 11 of reception apparatus 20 decodes the transfer channel coded data received by receiver 10 (S101), and extracts the TLV packet from the transfer slot (S102).

Next, TLV demultiplexer 12 performs DEMUX on the extracted TLV packet to extract the IP packet (S103). At this time, the header of the compressed IP packet is reproduced.

Next, IP demultiplexer 13 performs DEMUX on the IP packet, acquires the specified IP data flow, and extracts the MMT packet (S104).

Next, MMT demultiplexer 14 analyzes the header of the MMT packet, and determines whether the extension field is used and whether the reference clock information is in the extension field (S106). When there is no reference clock information in the extension field (No in S106), the process ends.

On the other hand, when the determination is made that the reference clock information is in the extension field (Yes in S106), reference clock information extractor 15 extracts the reference clock information from the extension field (S107). Then, reference clock generator 16 generates the system clock based on the extracted reference clock information (S108). The system clock is, in other words, a clock for reproducing content.

Figure 6:
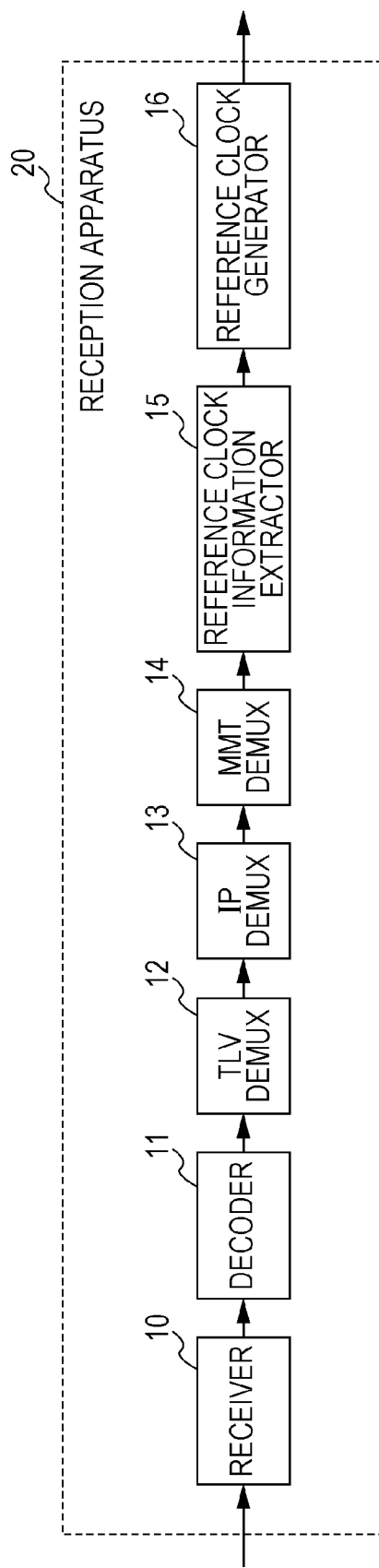
FIG. 6 is a block diagram illustrating the functional configuration of the reception apparatus when the reference clock information is stored in control information.
Figure 7:
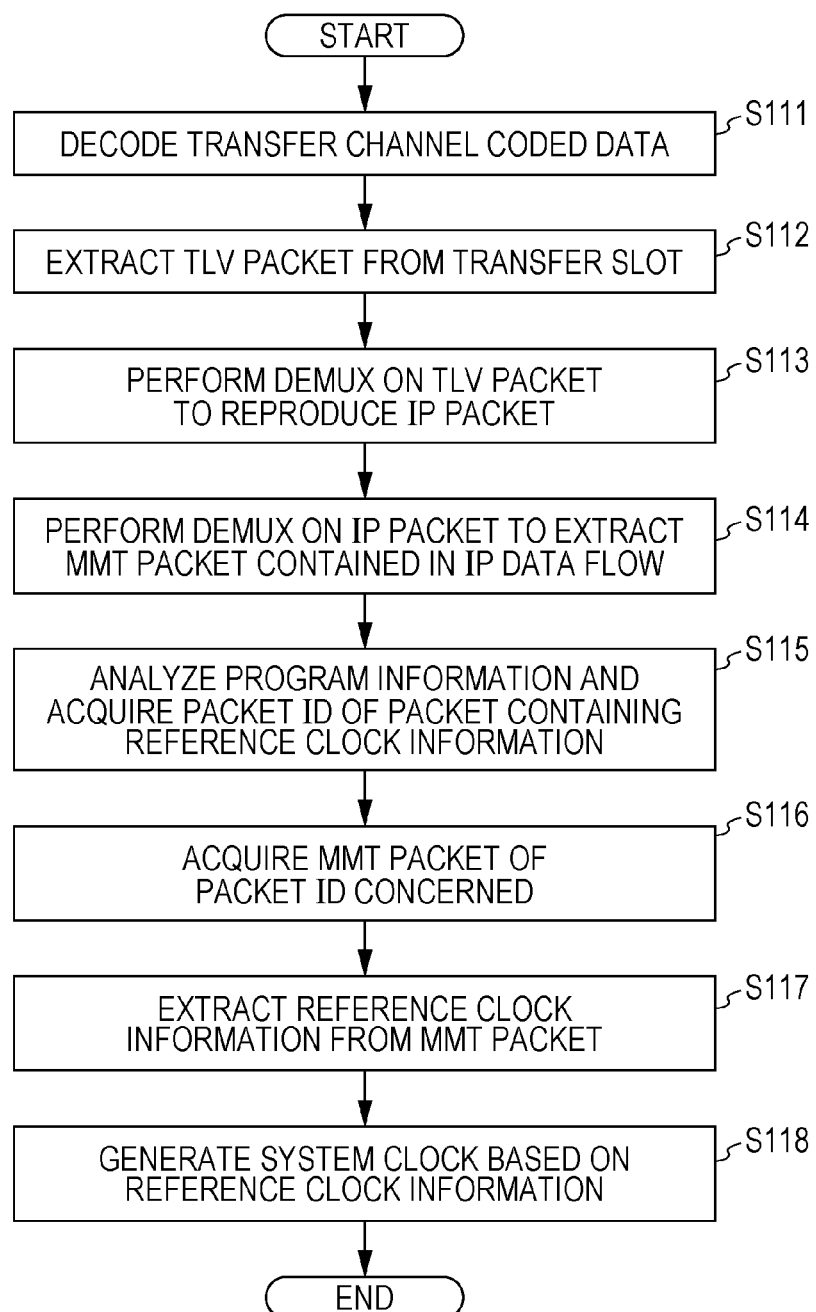
FIG. 7 is a diagram illustrating the acquisition flow of the reference clock information performed by the reception apparatus when the reference clock information is stored in the control information.

Next, the acquisition flow of the reference clock information by reception apparatus 20 when the reference clock information is stored in the control information will be described. FIG. 6 is a block diagram illustrating the functional configuration of reception apparatus 20 when the reference clock information is stored in the control information. FIG. 7 is a diagram illustrating the acquisition flow of the reference clock information performed by reception apparatus 20 when the reference clock information is stored in the control information.

As illustrated in FIG. 6, when the reference clock information is stored in the control information, reference clock information extractor 15 is disposed downstream of MMT demultiplexer 14.

In the flow of FIG. 7, the processes of step S111 to step S114 are identical to the flow of step S101 to step S104 described in FIG. 5.

Subsequent to step S114, MMT demultiplexer 14 acquires the packet ID of the packet containing the reference clock information from the program information (S115), and acquires the MMT packet of the packet ID (S116). Subsequently, reference clock information extractor 15 extracts the reference clock information from the control signal contained in the extracted MMT packet (S117), and reference clock generator 16 generates the system clock based on the extracted reference clock information (S118).

[Method for Storing the Reference Clock Information in the TLV Packet]

As described in FIG. 5 and FIG. 7, when the reference clock information is stored in the MMT packet, in order to obtain the reference clock information, reception apparatus 20 extracts the TLV packet from the transfer slot and extracts the IP packet from the TLV packet. Furthermore, reception apparatus 20 extracts the MMT packet from the IP packet, and further extracts the reference clock information from the header or a payload of the MMT packet. Thus, when the reference clock information is stored in the MMT packet, reception apparatus 20 has many processes for acquiring the reference clock information, and longer time is required until the acquisition, which need to be addressed.

Therefore, a method will be described for implementing a process of adding a time stamp to a medium, such as video and audio, based on the reference clock, and a process of transferring the medium by using the MMT scheme, and for implementing transfer of the reference clock information by using a lower layer, lower protocol, or lower multiplexing scheme than the MMT layer.

Figure 8:
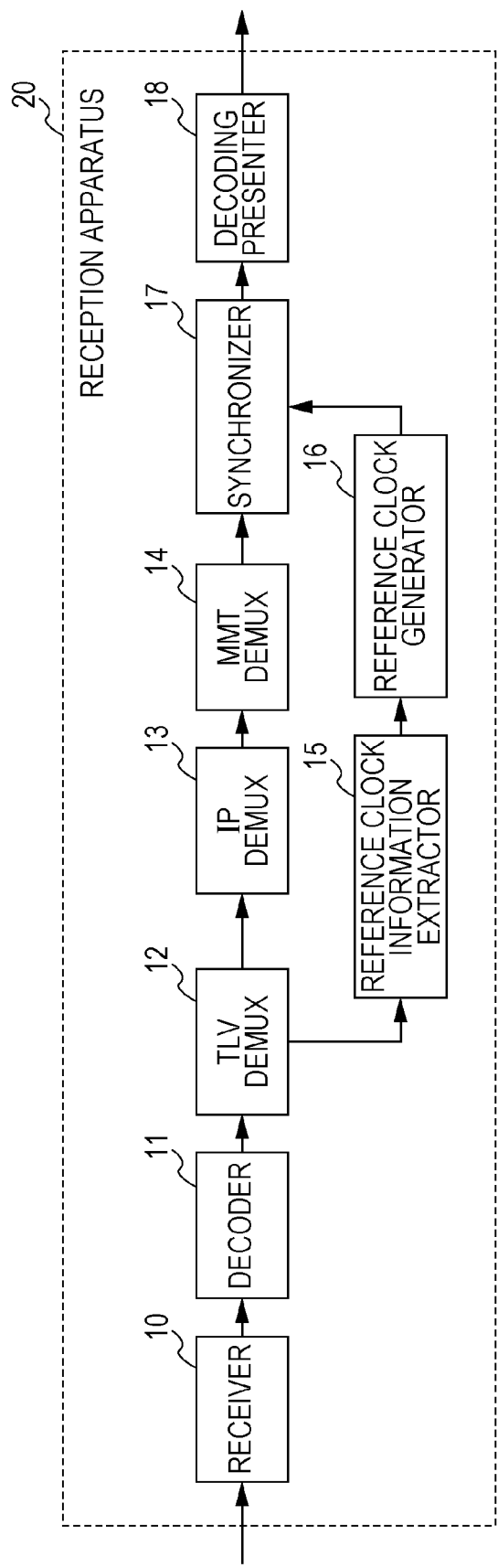
FIG. 8 is a block diagram illustrating the configuration of the reception apparatus when the reference clock information is stored in the TLV packet.

First, a method for storing the reference clock information in the TLV packet for transfer will be described. FIG. 8 is a block diagram illustrating the configuration of reception apparatus 20 when the reference clock information is stored in the TLV packet.

Reception apparatus 20 illustrated in FIG. 8 differs from reception apparatus 20 of FIG. 4 and FIG. 6 in placement of reference clock information extractor 15 and reference clock generator 16. In addition, synchronizer 17 and decoding presenter 18 are also illustrated in FIG. 8.

The TLV packet includes the 8-bit data type, 16-bit data length, and 8*N-bit data, as illustrated in aforementioned FIG. 2. In addition, 1-byte header which is not illustrated in FIG. 2 exists before the data type, as described above. Here, the data type is specifically prescribed, for example, as 0x01: IPv4 packet, 0x03: header-compressed IP packet, etc.

In order to store new data in the TLV packet, an undefined area of the data type is used to prescribe the data type. In order to indicate that the reference clock information is stored in the TLV packet, the data type describes that the data is reference clock information.

Note that the data type may be prescribed for each kind of the reference clock. For example, the data types that indicate the short-format NTP, long-format NTP, and PCR (Program Clock Reference) may be prescribed individually. FIG. 9 is a diagram illustrating an example in which the long-format NTP is stored in the TLV packet. The long-format NTP is stored in a data field.

In this case, reference clock information extractor 15 analyzes the data type of TLV packet. When the reference clock information is stored, reference clock information extractor 15 analyzes the data length, and extracts the reference clock information from the data field.

Here, when the data length is uniquely determined by the data type, reference clock information extractor 15 may acquire the reference clock information without analyzing a data length field. For example, when the data type indicates a 64-bit long format NTP, reference clock information extractor 15 may extract a section from 4 bytes+first bit to 4 bytes+64-th bit. Also, reference clock information extractor 15 may extract a desired bit from 64-bit data.

Figure 10:
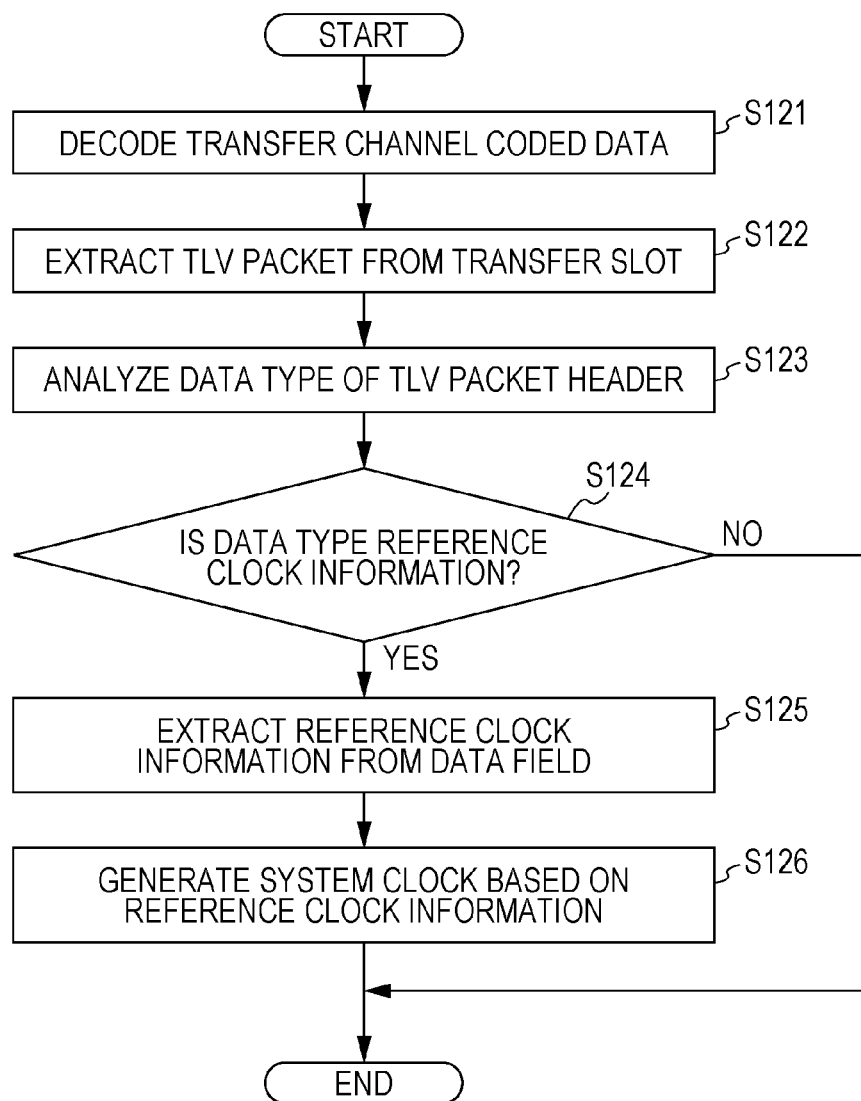
FIG. 10 is a diagram illustrating the acquisition flow of the reference clock information performed by the reception apparatus when the reference clock information is stored in the TLV packet.

Next, the operation flow of reception apparatus 20 when the reference clock information is stored in the TLV packet (acquisition flow of the reference clock information) will be described with reference to FIG. 10. FIG. 10 is a diagram illustrating the acquisition flow of the reference clock information performed by reception apparatus 20 when the reference clock information is stored in the TLV packet.

In the flow of FIG. 10, first, decoder 11 decodes the transfer channel coded data received by receiver 10 (S121), and extracts the TLV packet from the transfer slot (S122).

Next, TLV demultiplexer 12 analyzes the data type of TLV packet (S123), and determines whether the data type is the reference clock information (S124). When the data type is the reference clock (Yes in S124), reference clock information extractor 15 extracts the reference clock information from the data field of the TLV packet (S125). Then, reference clock generator 16 generates the system clock based on the reference clock information (S126). On the other hand, when the data type is not the reference clock information, (No in S124), the acquisition flow of the reference clock information ends.

In addition, in an unillustrated flow, IP demultiplexer 13 extracts the IP packet according to the data type. Then, the IP DEMUX process and MMT DEMUX process are performed on the extracted IP packet, and the MMT packet is extracted. Furthermore, synchronizer 17 outputs video data to decoding presenter 18 with timing with which the time stamp of the video data contained in the extracted MMT packet coincides with the reference clock generated in step S126. Decoding presenter 18 decodes and presents the video data.

In a transmission method described above, the data type of the TLV packet indicates that the reference clock information is stored, and the reference clock information is stored in the data field of the TLV packet. By the transmission apparatus storing and transmitting the reference clock information by using a lower layer or lower protocol than the MMT layer, reception apparatus 20 may reduce the processes and time until the reference clock information is extracted.

Also, since reception apparatus 20 may extract and reproduce the reference clock information in a lower layer extending over the IP layer, reception apparatus 20 may extract the reference clock information by hardware implementation. This allows reception apparatus 20 to reduce more influence of jitter or the like than extracting the reference clock information by software implementation, and to generate higher-precision reference clock.

Next, other methods for storing the reference clock information will be described.

When the data length is uniquely determined according to the data type in the aforementioned flow of FIG. 10, the data length field does not need to be transmitted. Here, when the data length field is not transmitted, an identifier is stored indicating that the data length field is data that is not transmitted.

Although the reference clock information is stored in the data field of the TLV packet according to the description of FIG. 10, the reference clock information may be appended immediately before or after the TLV packet. Also, the reference clock information may be appended immediately before or after data to be stored in the TLV packet. In these cases, a data type that allows specification of a position where the reference clock information is appended is added.

For example, FIG. 11 is a diagram illustrating structure in which the reference clock information is appended immediately before the IP packet header. In this case, the data type indicates an IP packet with reference clock information. When the data type indicates an IP packet with reference clock information, reception apparatus 20 (reference clock information extractor 15) may acquire the reference clock information by extracting bits of a previously prescribed predetermined length of the reference clock information from a head of the data field of the TLV packet.

At this time, the data length may specify the length of data that includes the length of the reference clock information, and may specify the length that does not include the length of the reference clock information. When the data length specifies the length of data that includes the length of the reference clock information, reception apparatus 20 (reference clock information extractor 15) acquires data of a length obtained by subtracting the length of the reference clock information from the data length from immediately after the reference clock information.

When the data length specifies the length of data that does not include the length of the reference clock information, reception apparatus 20 (reference clock information extractor 15) acquires data of the length specified by the data length from immediately after the reference clock information.

Figure 13:
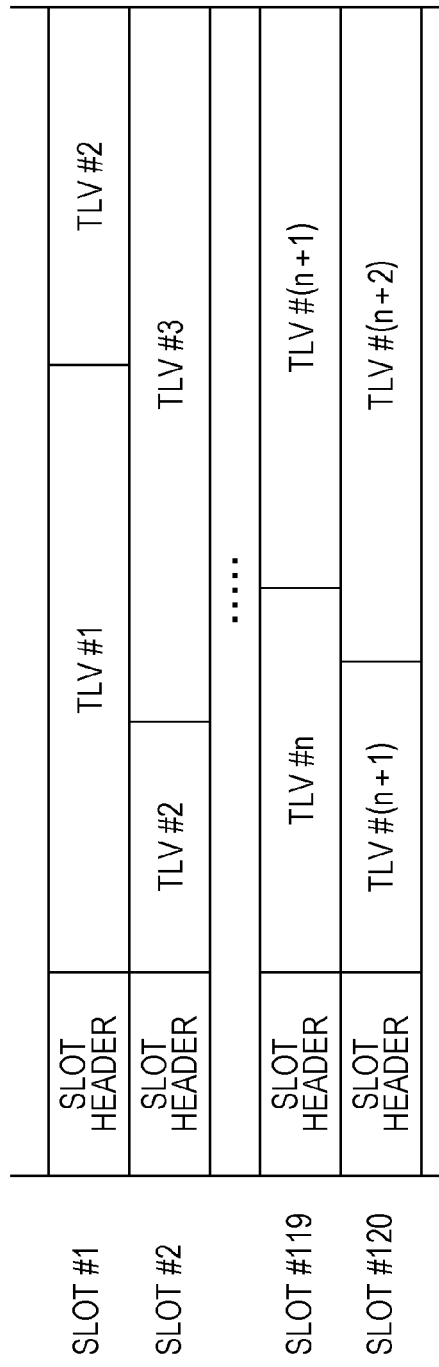
FIG. 13 is a diagram illustrating structure of a transfer slot.

In addition, FIG. 12 is a diagram illustrating structure in which the reference clock information is appended immediately before the TLV packet. In this case, the data type is a conventional data type. An identifier indicating that the TLV packet is a TLV packet with reference clock information is stored, for example, in a slot header of the transfer slot or the TMCC control information. FIG. 13 is a diagram illustrating structure of the transfer slot, and FIG. 14 is a diagram illustrating structure of the slot header of the transfer slot.

In FIG. 13, the transfer slot includes a plurality of slots (120 slots of Slot #1 to Slot #120 in the example of FIG. 13). A bit number contained in each slot is a fixed bit number uniquely determined based on a coding rate of error correction, and each slot has a slot header and stores one or more TLV packets. Note that, in FIG. 13, the TLV packet is variable-length.

Figure 14:
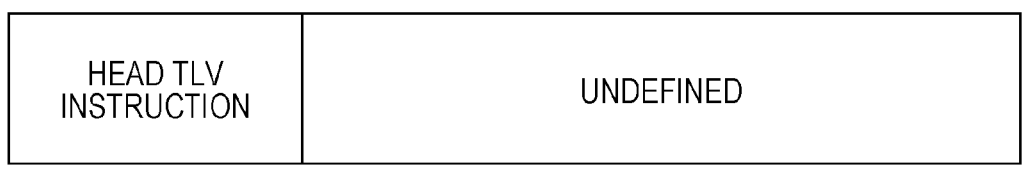
FIG. 14 is a diagram illustrating structure of a slot header of the transfer slot.

In FIG. 14, a position of a head byte of a first TLV packet within the slot is stored in a head TLV instruction field (16 bits) of the slot header as a value represented with a byte number from a slot head except the slot header. Remaining 160 bits of the slot header is undefined.

The transfer slot includes 120 slots per frame as described above, and a modulation scheme is assigned to the slots in 5-slot unit. In addition, up to 16 streams may be transferred within one frame.

Note that the plurality of streams included in one transfer slot differ from one another, for example, in content (or a company that provides the content) transferred by the stream. In addition, each stream includes one or more slots, and one slot does not extend over the plurality of streams.

When the identifier indicating that the TLV packet is a TLV packet with reference clock information is stored in the slot header, for example, information that allows specification of a position of the TLV packet with reference clock information, kind of the reference clock information, data length, and the like are stored in the slot by extending (using) an undefined field of the slot header.

Note that all pieces of information including the information that allows specification of the position of the TLV packet with reference clock information, kind of the reference clock information, and data length do no need to be stored in the slot header. The slot may indicate information that allows specification of and reference to the TLV packet with reference clock information.

Figure 15:
FIG. 15 is a diagram illustrating an example in which a flag is stored in an undefined area of the slot header.

For example, when definition is made that the reference clock information is a 64-bit long-format NTP, that only one TLV packet with reference clock information may be stored in one slot, and that the one TLV packet with reference clock information is always the head TLV packet, a flag may be stored in the undefined area of the slot header. FIG. 15 is a diagram illustrating an example in which the flag is stored in the undefined area of the slot header.

In FIG. 15, the flag (described as "F" in the diagram) indicating whether the reference clock information is contained in the slot is stored in the undefined area of the slot header. With such a flag, reception apparatus 20 may determine that the head TLV packet is a TLV packet with reference clock information.

In addition, the identifier (information) indicating that the TLV packet is a TLV packet with reference clock information may be stored in the TMCC control information. FIG. 16 is a diagram illustrating structure of the TMCC control information under a transfer scheme of an advanced broadband satellite digital broadcast.

The information for specifying and referencing the TLV packet with reference clock information may be stored in extension information within the TMCC control information illustrated in FIG. 16, and may be stored in another place within the TMCC control information. For example, stream classification/relative stream information in the TMCC control information may be used as information for specifying and referencing the TLV packet with reference clock information. FIG. 17 is a diagram illustrating the stream classification/relative stream information in the TMCC control information.

In FIG. 17, in the stream classification/relative stream information, the stream classification of each of 16 streams is indicated in 8 bits. That is, 1-frame transfer slot may transfer up to 16 (16-classification) streams. For example, the stream classification of an MPEG2-TS stream is "00000000", and the stream classification of the TLV stream is "00000010". However, under the current circumstances, the classifications of other streams are unassigned or undefined.

Therefore, when the stream classification of the TLV stream with reference clock is defined, for example, as "00000100" and the relative stream is the TLV stream with reference clock, "00000100" is stored in the stream classification/relative stream information in the TMCC control information. Here, in the stream with the stream classification of "00000100", the TLV packet containing reference clock information is stored, for example, once per 5-slot unit which is a slot assignment unit, or once per frame unit in stream classification/relative stream information 128.

Reception apparatus 20 analyzes stream classification/relative stream information 128 in the TMCC control information. When the stream classification is "00000100", reception apparatus 20 acquires the TLV packet with reference clock from the slot determined in advance.

Note that a case may be considered where the stream classification including download type TLV packets and the stream classification including stream type TLV packets, such as video and audio, are defined. In such a case, reception apparatus 20 may determine that the reference clock information is contained in the stream when the stream classification of the received stream is a stream type TLV packet. This is because the reference clock information is not used in reproduction of download type TLV packets.

In addition, when the information for specifying and referencing the TLV packet with reference clock information is stored in the extension information of the TMCC control information, for example, information for each of 16 relative streams is stored in the extension area of the TMCC control information.

Figure 18:
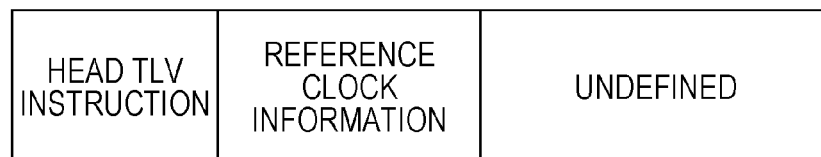
FIG. 18 is a diagram illustrating an example in which the reference clock information is stored in an undefined field of the slot header.

Also, as illustrated in FIG. 18, an area into which the reference clock information is stored may be newly defined in the undefined field of the slot header. FIG. 18 is a diagram illustrating an example in which the reference clock information is stored in the undefined field of the slot header.

Also, the reference clock information may be stored in a previously determined slot, and information indicating that the reference clock information is contained may be stored within the slot header. Here, the previously determined slot is, for example, a head slot of the transfer slot (Slot #1 in the example of FIG. 13), and the reference clock information stored in the IP packet may be contained in the head TLV packet within this slot. Also, when the plurality of streams are contained in the transfer slot, the previously determined slot may be, for example, a head slot of each stream contained in the transfer slot, and the reference clock information stored in the IP packet may be contained in the head TLV packet within this slot.

Also, the TMCC control information may store information for specifying and referencing the slot header containing the reference clock information. Note that a storage method of the information for specifying and referencing the slot header containing the reference clock information in the TMCC control information is similar to the aforementioned storage method of the information for specifying and referencing the TLV packet with reference clock information, and thus description thereof will be omitted.

In this case, reception apparatus 20 analyzes the TMCC control signal, and when determination is made that the reference clock information is in the slot header, reception apparatus 20 extracts the reference clock information from the slot header.

Figure 19:
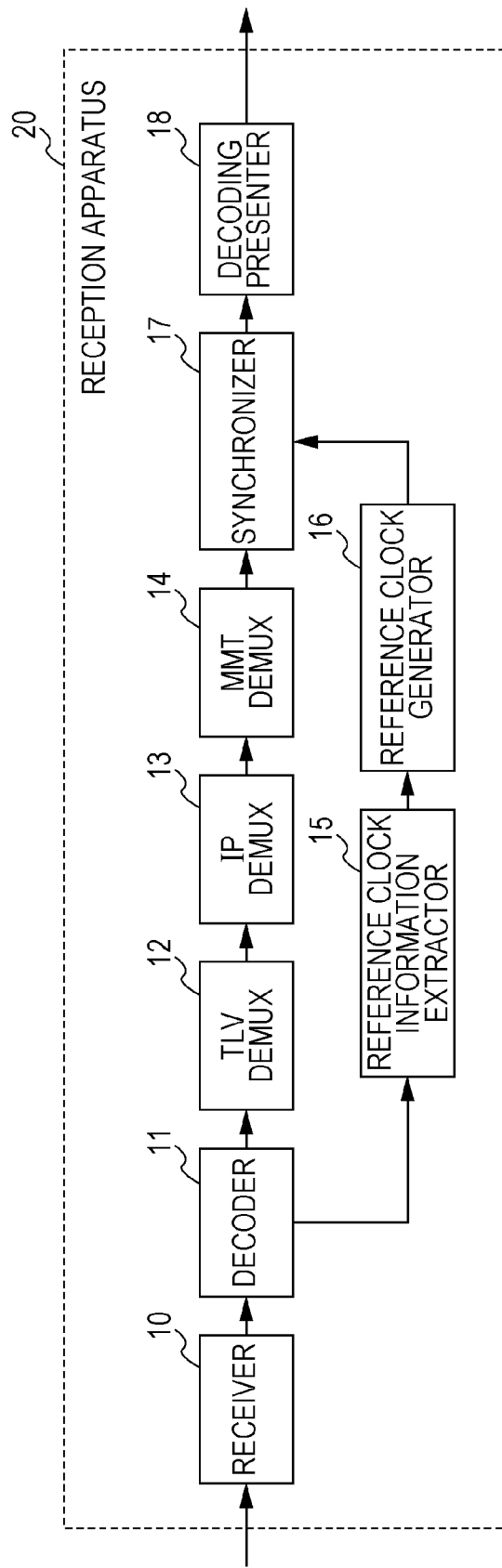
FIG. 19 is a block diagram illustrating the functional configuration of the reception apparatus when information indicating that the reference clock information is contained within the slot header is stored in TMCC control information.
Figure 20:
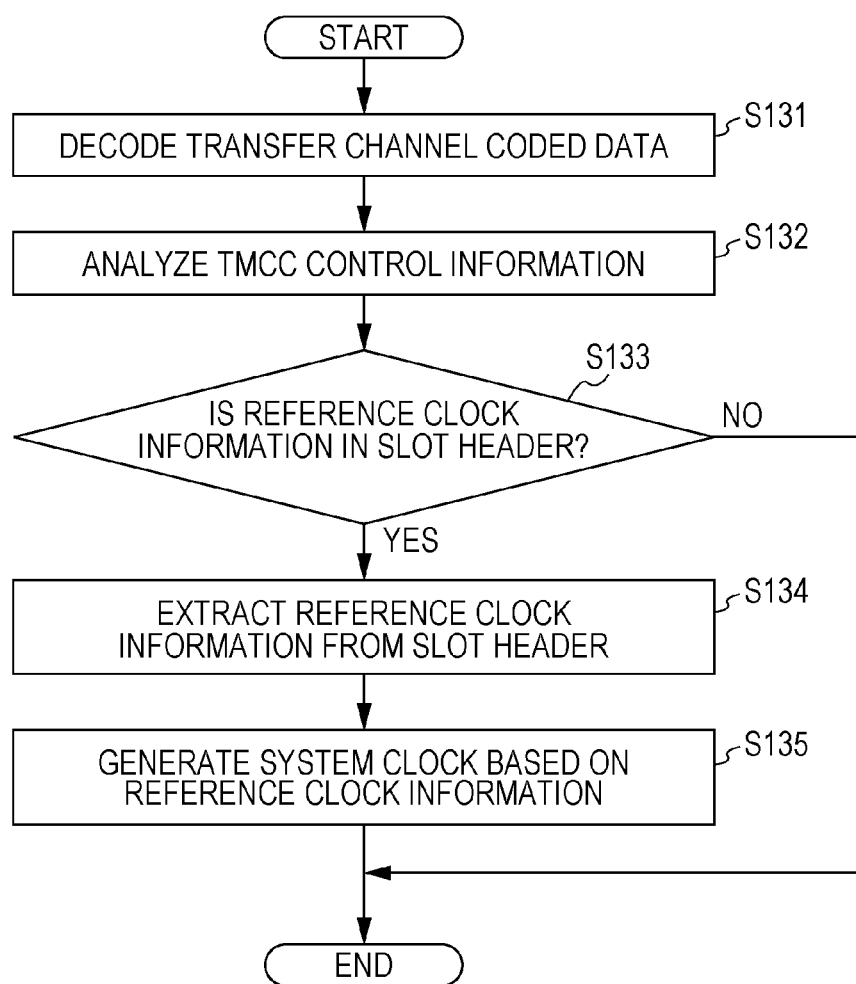
FIG. 20 is a diagram illustrating the acquisition flow of the reference clock information when the information indicating that the reference clock information is contained in the slot header is stored in the TMCC control information.

Also, the TMCC control information may store the information indicating that the reference clock information is contained. FIG. 19 is a block diagram illustrating the functional configuration of reception apparatus 20 when the information indicating that the reference clock information is contained within the slot header is stored in the TMCC control information. FIG. 20 is a diagram illustrating the acquisition flow of the reference clock information when the information indicating that the reference clock information is contained in the slot header is stored in the TMCC control information.

In FIG. 19, when the information indicating that the reference clock information is contained within the slot header is stored in the TMCC control information, in reception apparatus 20, reference clock information extractor 15 acquires the reference clock signal from the transfer slot that is output from decoder 11.

In the flow of FIG. 20, decoder 11 decodes the transfer channel coded data (S131), analyzes the TMCC control signal (S132), and determines whether the reference clock information is in the slot header within the transfer slot (S133). When the reference clock information is in the slot header (Yes in S133), reference clock information extractor 15 extracts the reference clock information from the slot header (S134), and reference clock generator 16 generates the reference clock of the system (system clock) based on the reference clock information (S135). On the other hand, when the reference clock information is not in the slot header (No in S133), the acquisition flow of the reference clock information ends.

Such reception apparatus 20, which may acquire the reference clock information in the layer of the transfer slot, may acquire the reference clock information more quickly than a case where the reference clock information is stored in the TLV packet.

As described above, by storing the reference clock information in the TLV packet or transfer slot, reception apparatus 20 may reduce the processes until the acquisition of the reference clock information, and may shorten acquisition time of the reference clock information.

In addition, by storing the reference clock information in a physical layer, reception apparatus 20 may easily implement acquisition and reproduction of the reference clock information by hardware, and may reproduce a clock with higher-precision than acquisition and reproduction of the reference clock information by software.

In addition, in the aforementioned transmission method according to the first exemplary embodiment, the transmission apparatus adds, in the system in which the plurality of layers (protocols) exists including the IP layer, the time stamp of a medium based on the reference clock information in the layers upper than the IP layer, and transmits the reference clock information in the layers lower than the IP layer. This allows reception apparatus 20 to process the reference clock information easily by hardware.

Note that, based on a similar idea, storing the reference clock information within the IP packet in a condition of not being stored in the MMT packet may also be considered. Even in such a case, reception apparatus 20 may reduce the processes for acquiring the reference clock information as compared with the case where the reference clock information is stored in the MMT packet.

[Transmission Cycle of the Reference Clock Information]

Hereinafter, a transmission cycle of the reference clock information will be supplemented.

In the case of storing the reference clock information in the TLV packet, for example, the transmission apparatus stores time when the head bit of the TLV packet is transmitted as the reference clock information. In addition, not the transmission time of the head bit but predetermined time determined differently may be stored as the reference clock information.

The TLV packet containing the reference clock information is transmitted at predetermined intervals. In other words, the TLV packet containing the reference clock information is contained in the transfer slot and is transmitted in a predetermined transmission cycle. For example, at least one or more pieces of reference clock information in 100 ms may be stored in the TLV packet and be transferred.

In addition, the transmission apparatus may place the TLV packet containing the reference clock information at predetermined intervals at a predetermined position of the transfer slot under the advanced BS transfer scheme. In addition, the transmission apparatus may store the TLV packet containing the reference clock information once every 5-slot unit which is a slot assignment unit of the TLV packet, and may store the reference clock information in the head TLV packet of the first slot of the 5-slot unit. That is, the transmission apparatus may place the TLV packet containing the reference clock information at a head within the head slot within the transfer slot (that is, immediately after the slot header).

Also, the transmission apparatus may place the TLV packet containing the reference clock information at predetermined intervals at a predetermined place of the transfer slot under the transfer scheme of the advanced broadband satellite digital broadcast. For example, the transmission apparatus may store the reference clock information in the head TLV packet of the first slot once every 5-slot unit which is a slot assignment unit. That is, the TLV packet positioned at a head within the head slot of each stream contained in the transfer slot may contain the reference clock information. Also, the reference clock information may be stored in the first slot within the relative stream.

In addition, the transmission cycle and transmission interval of the reference clock information may be changed according to a modulation scheme or coding rate of the transfer channel coding scheme.

[Method for Acquiring the Reference Clock Information in the Upper Layer Quickly]

Next, a method will be described for shorten time to the acquisition of the reference clock information by reception apparatus 20 performing batch DEMUX processing from the lower layer to the upper layer.

Here, a method will be described in which the transmission apparatus stores the reference clock information in the upper layer such as the MMT packet, and stores in the IP packet the MMT packet in which the reference clock information is stored. In the method described below, by defining a protocol for storing in the TLV packet the IP packet in which the reference clock information is stored, the reception apparatus makes direct reference of the MMT packet which is the upper layer from the lower layer such as the TLV packet, and acquires the reference clock information contained in the MMT packet without performance of normal DEMUX processing.

The transmission apparatus contains the reference clock information in the aforementioned control information stored in the MMT packet. The previously determined packet ID is added to the control information containing the reference clock information. Then, the transmission apparatus stores the MMT packet containing the reference clock information in a dedicated IP data flow, and adds the previously determined source IP address, destination IP address, source port number, destination port number, and protocol classification.

On receipt of the transfer channel coded data generated in this way, reception apparatus 20 may extract the IP packet containing the reference clock information by TLV demultiplexer 12 acquiring the previously determined IP data flow.

Note that when the IP packet undergoes header compression processing, reception apparatus 20 adds, for example, an identifier indicating that the IP packet contains the reference clock information to a context identifier indicating identical IP data flows. The context identifier is stored in a compressed IP packet header. In this case, reception apparatus 20 may extract the IP packet containing the reference clock information with reference to the context identifier in the compressed IP packet header.

In addition, the IP packet containing the reference clock information may be prescribed not to undergo the header compression, and may be prescribed to always undergo the header compression. It may be prescribed that the previously determined context identifier may be added to the IP packet containing the reference clock information, and that all the headers are compressed.

In addition, a method may also be considered for defining, in a TLV data type field, an identifier indicating that the TLV packet is an IP packet that belongs to the IP data flow containing the reference clock information, or an identifier indicating that the TLV packet is a compressed IP packet that belongs to the IP data flow containing the reference clock information. The following describes the method.

Reception apparatus 20 determines the TLV data type. On determination that the reference clock information is contained, reception apparatus 20 acquires the reference clock information contained within the MMT packet directly from the IP packet.

Thus, reception apparatus 20 may extract the reference clock information contained in the MMT packet by extracting a bit string at a specific position from the IP packet or compressed IP packet, without analyzing the IP address, port number, or context identifier. Extracting the bit string at a specific position means, for example, extracting information of a specific length from a position that is offset by fixed-length bytes from the TLV packet header. Accordingly, the reference clock information is acquired.

The offset length of the fixed-length bytes for extracting the reference clock information is uniquely determined for each of the IP packet and the compressed IP packet. Therefore, reception apparatus 20 may acquire the reference clock information by extracting the information of the specific length from the position that is offset by the fixed-length bytes after determining the TLV data type.

Note that the aforementioned method is one example, and reception apparatus 20 may acquire the reference clock information in the upper layer from the lower layer by defining another protocol or identifier. For example, an identifier indicating whether the IP packet contains the reference clock information may be stored in a field other than the TLV data type field.

Figure 21:
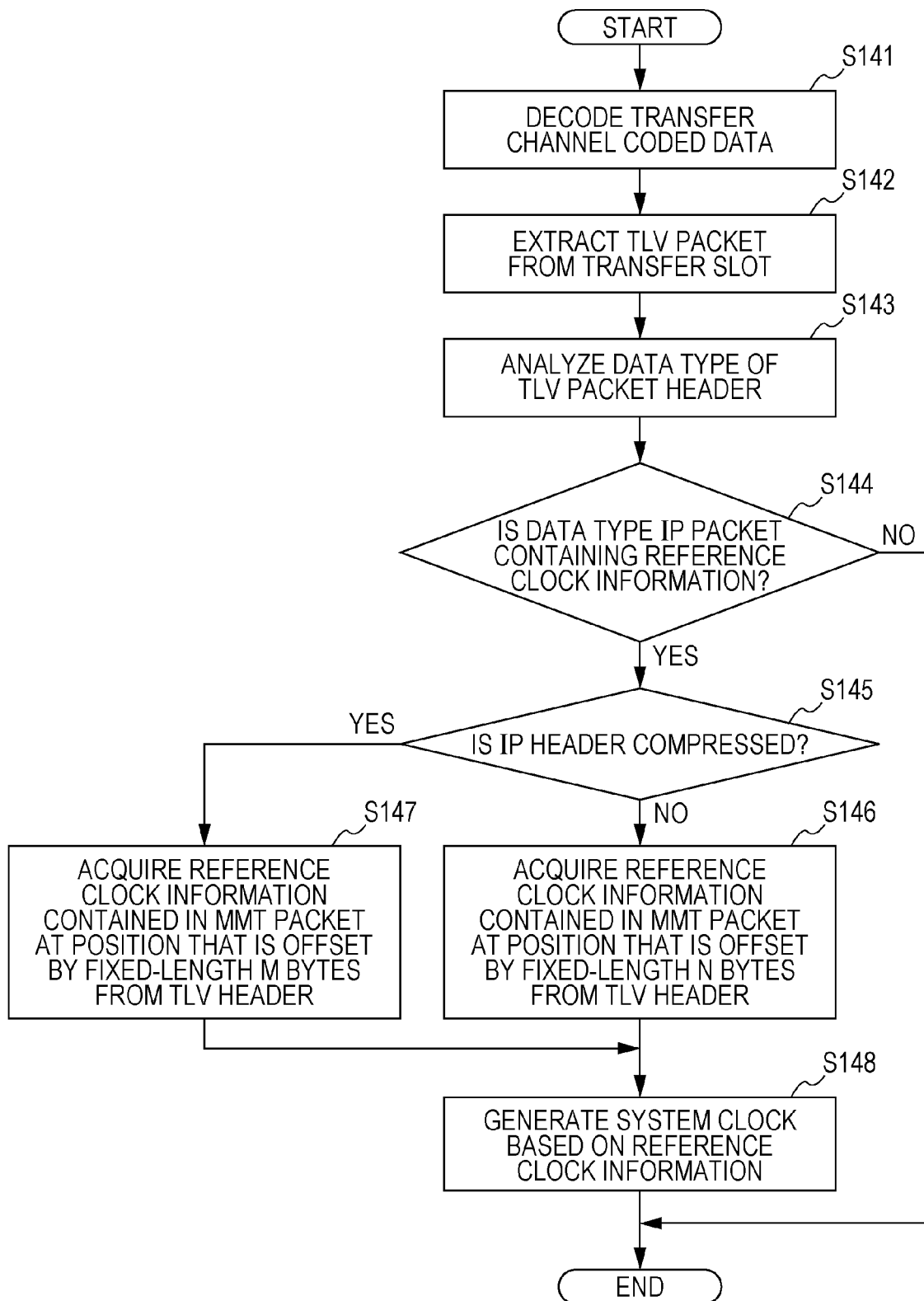
FIG. 21 is a diagram illustrating a flow of extracting a bit string at a specific position from the IP packet or compressed IP packet.

In addition, for example, reception apparatus 20 may extract reference time information contained in the MMT packet by extracting the bit string of a specific position from the IP packet or compressed IP packet without analyzing the IP address, the port number, or the context identifier. FIG. 21 is a diagram illustrating a flow for extracting the bit string of a specific position from the IP packet or compressed IP packet. Note that the configuration of reception apparatus 20 is similar to the block diagram illustrated in FIG. 8.

In the flow of FIG. 21, first, decoder 11 decodes the transfer channel coded data received by receiver 10 (S141), and extracts the TLV packet from the transfer channel slot (S142).

Next, TLV demultiplexer 12 analyzes the data type of TLV packet (S143), and determines whether the data type is an IP containing reference clock information (S144). When the determination is made that the data type is not an IP packet containing reference clock information (No in S144), the flow ends. When the determination is made that the data type is an IP packet containing reference clock information (Yes in S144), TLV demultiplexer 12 determines whether the IP header is compressed (S145).

When the IP header is not compressed (No in S145), reference clock information extractor 15 acquires the reference clock information contained within the MMT packet at a position that is offset by fixed-length N bytes from the TLV header (S146). When the IP header is compressed (Yes in S145), reference clock information extractor 15 acquires the reference clock information contained within the MMT packet at a position that is offset by fixed-length M bytes from the TLV header (S147).

Finally, reference clock generator 16 generates the system clock based on the reference clock information (S148).

Note that, since data structure of the IP packet header differs according to whether the IP packet is IPv4 or IPv6, the fixed-length N bytes and M bytes have different values.

While the normal MMT packet containing audio, video, control signal, and the like undergoes DEMUX processing in normal steps, the MMT packet containing the reference clock information undergoes batch DEMUX processing from the lower layer to the upper layer. This allows the reception apparatus to acquire the reference clock information in the lower layer even when the reference clock information is stored in the upper layer. That is, this allows the reception apparatus to reduce the processes for acquisition of the reference clock information, to shorten time to the acquisition of the reference clock information, and to facilitate hardware implementation.

Other Exemplary Embodiments

Although the first exemplary embodiment has been described above, the present disclosure is not limited to the aforementioned exemplary embodiment.

Although the aforementioned exemplary embodiment has described the storage method of the reference clock information, a plurality of pieces of reference clock information may be transmitted in one or more layers. When the plurality of pieces of reference clock information is transmitted, reception apparatus 20 may select one piece of the reference clock information and use the selected reference clock information for generation of the reference clock (system clock), and may use both pieces of the reference clock information to generate the reference clock. At this time, reception apparatus 20 may select high-precision reference clock information, and may select reference clock information that may be acquired more quickly.

Also, it is assumed that, for example, in addition to the 32-bit short-format NTP contained in the conventional MMT packet header, higher-precision reference clock information is transmitted. In such a case, information is further transmitted from the transmission apparatus for allowing reception apparatus 20 to use the high-precision reference clock information to reproduce the 32-bit short-format NTP. Such information is, for example, time information indicating a relative relationship between clocks, and a configuration, etc. for transmitting the information by using CRI_descriptor( ), etc. may be considered.

Note that, when reception apparatus 20 may reproduce the 32-bit short-format NTP, the conventional NTP field contained in the MMT packet header is unnecessary. Therefore, the transmission apparatus may store another piece of information in the NTP field, and may perform header compression by reducing the NTP field. When header compression is performed, the transmission apparatus transmits information indicating that the NTP field is reduced. When the NTP field is reduced, reception apparatus 20 generates the reference clock by using another piece of reference clock information, and reproduces the 32-bit short-format NTP.

In addition, when the MMT packet is transferred using a broadband transfer channel, a broadband reception apparatus may use the 32-bit short-format NTP for QoS control, and may not use the reference clock information. Accordingly, the reference clock information does not need to be transmitted through the broadband transfer channel. In addition, when end-to-end delay of the broadband transfer channel is within a certain value, the broadband reception apparatus may use the reference clock information for clock reproduction.

Note that although the aforementioned first exemplary embodiment has described the case where the MMT/IP/TLV scheme is used as an example, schemes other than the MMT scheme may be used as a multiplexing scheme. For example, the present disclosure may also be applied to an MPEG2-TS scheme, RTP scheme, or MPEG-DASH scheme.

In addition, methods for header compression of IP packets include RoHC (Robust Header Compression) and HCfB (Header Compression for Broadcasting).

Schemes for storing IP packets in broadcast include a GSE (Generic Stream Encapsulation) scheme, IPoverTS scheme using ULE (Unidirectional Light-weight. Encapsulation), and the like, in addition to the TLV scheme.

The present disclosure may be applied to a case where any of such schemes is used. Application of the present disclosure allows reception apparatus 20 to achieve shortening of time to the acquisition of the reference clock information and reduction in the processes, and to achieve high precision of the clock by hardware implementation.

Figure 22:
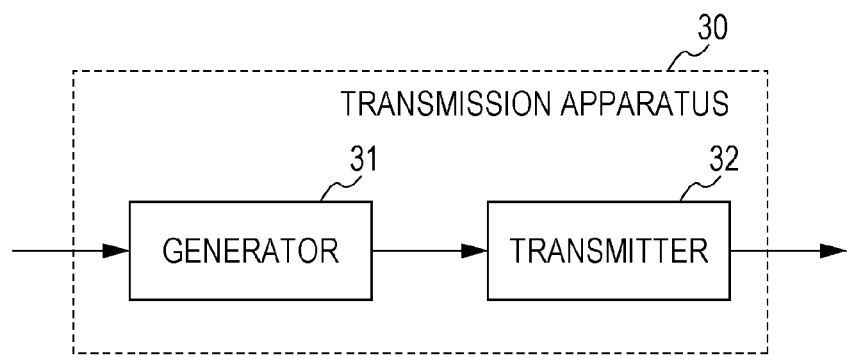
FIG. 22 is a block diagram illustrating a functional configuration of a transmission apparatus.
Figure 23:
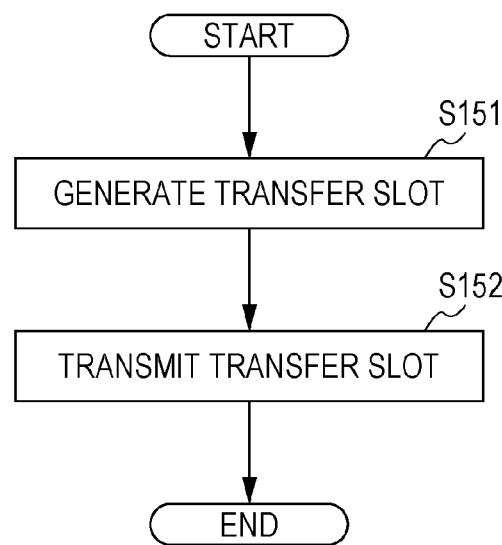
FIG. 23 is a diagram illustrating an operation flow of the transmission apparatus.

In addition, the present disclosure may be implemented as a transmission apparatus (transmission method) that transmits the transfer slot that stores the reference clock information by the above method. The following supplements a configuration of such a transmission apparatus. FIG. 22 is a block diagram illustrating a functional configuration of the transmission apparatus. FIG. 23 is a diagram illustrating an operation flow of the transmission apparatus.

As illustrated in FIG. 22, transmission apparatus 30 includes generator 31 and transmitter 32. Note that each component of transmission apparatus 30 is specifically implemented by a microcomputer, a processor, dedicated circuitry, or the like.

Transmission apparatus 30 is specifically a broadcasting server, and is an example of the aforementioned "transmission apparatus" in the first exemplary embodiment.

Generator 31 generates, for example, the transfer slot that stores the plurality of slots that each store the one or more TLV packets that each store the IP packet (S151 of FIG. 23). The transfer slot contains the plurality of relative streams that each include one or more slots.

Generator 31 contains the reference clock information, such as the NTP indicating time for reproduction of content (for example, broadcast content such as video and audio) in reception apparatus 20, in the TLV packet positioned at a head within the head slot of each relative stream contained in the transfer slot. Specifically, generator 31 includes a coder that codes the broadcast content, MMT multiplexer, IP multiplexer, and TLV multiplexer. Here, the TLV packet is an example of a first transfer unit, the slot is an example of a second transfer unit, and the transfer slot is an example of a transfer frame. The relative stream is an example of the stream.

Transmitter 32 transmits the transfer slot generated by generator 31 (transfer channel coded data containing the transfer slot) through broadcast (S152 of FIG. 23).

As also described in the aforementioned first exemplary embodiment, transmission apparatus 30 contains the reference clock information in the TLV packet positioned at a head of each relative stream within the transfer slot to allow simplification of the processes by which reception apparatus 20 acquires the reference clock information of each of the plurality of streams. Therefore, this may shorten time until reception apparatus 20 acquires the reference clock information.

Note that in the aforementioned exemplary embodiment, components may each include dedicated hardware or may be implemented through execution of a software program suitable for each component. The components may be each implemented by a program execution unit, such as a CPU and a processor, reading and executing the software program recorded in a recording medium such as a hard disk and a semiconductor memory.

In addition, the components may be circuits. These circuits may constitute one circuit as a whole, and may be different circuits. In addition, each of these circuits may be a general-purpose circuit, and may be a dedicated circuit.

For example, in each of the aforementioned exemplary embodiments, processes executed by a specific processor may be executed by another processor. In addition, order of the plurality of processes may be changed, and the plurality of processes may be executed in parallel.

The reception apparatus (reception method) and transmission apparatus (transmission method) according to one or more aspects have been described above based on the exemplary embodiment. However, the present disclosure is not limited to this exemplary embodiment. The present exemplary embodiment to which various modifications conceivable by a person skilled in the art are made, and aspects that are made by combining elements of different exemplary embodiments may also be within the scope of the one or more aspects as long as such aspects do not depart from the gist of the present disclosure.

The transmission method according to the present disclosure is useful as a transmission method capable of reducing the processes of the reception apparatus for acquiring the reference clock information when the MMT scheme is applied to a broadcasting system.

What is claimed is:

1. A transmission method comprising:
coding video content;
configuring one or more transfer units that each include the coded video content; and
transmitting the one or more transfer units as a transmission signal, the transmission signal including first control information, second control information, and the one or more transfer units,
wherein the first control information includes a transmission parameter used for the second control information, and the second control information is provided for each of the one or more transfer units,
wherein in at least one transfer unit among the one or more transfer units, the second control information of the transfer unit contains clock information used for reproduction of the video content,
wherein information indicating that the clock information is contained within the second control information of the transfer unit is stored in the first control information, and
wherein the clock information is transmitted cyclically.

2. A reception method comprising:
receiving a transmission signal, the transmission signal including one or more transfer units that each include coded video content, first control information, and second control information;
decoding the coded video content; and
extracting clock information used for reproduction of the video content from at least one transfer unit among the one or more transfer units,
wherein the first control information includes a transmission parameter used for the second control information, the second control information being provided for each of the one or more transfer units,
wherein in the at least one transfer unit among the one or more transfer units, the second control information of the transfer unit contains the clock information used for reproduction of the video content,
wherein information indicating that the clock information is contained within the second control information of the transfer unit is stored in the first control information, and
wherein the clock information is transmitted cyclically.

3. A transmission device comprising:
coding circuitry which, in operation, codes video content;
configuration circuitry which, in operation, configures one or more transfer units that each include the coded video content; and
transmission circuitry which, in operation, transmits the one or more transfer units as a transmission signal, the transmission signal including first control information, second control information, and the one or more transfer units,
wherein the first control information includes a transmission parameter used for the second control information, and the second control information is provided for each of the one or more transfer units,
wherein in at least one transfer unit among the one or more transfer units, the second control information of the transfer unit contains clock information used for reproduction of the video content,
wherein information indicating that the clock information is contained within the second control information of the transfer unit is stored in the first control information, and
wherein the clock information is transmitted cyclically.

4. A reception device comprising:
reception circuitry which, in operation, receives a transmission signal, the transmission signal including one or more transfer units that each include coded video content, first control information, and second control information;
decoding circuitry which, in operation, decodes the coded video content; and
extraction circuitry which, in operation, extracts clock information used for reproduction of the video content from at least one transfer unit among the one or more transfer units,
wherein the first control information includes a transmission parameter used for the second control information, the second control information being provided for each of the one or more transfer units,
wherein in the at least one transfer unit among the one or more transfer units, the second control information of the transfer unit contains the clock information used for reproduction of the video content,
wherein information indicating that the clock information is contained within the second control information of the transfer unit is stored in the first control information, and
wherein the clock information is transmitted cyclically.

* * * * *